US006975970B2

(12) United States Patent
Thorisson

(10) Patent No.: US 6,975,970 B2
(45) Date of Patent: Dec. 13, 2005

(54) METHOD FOR DESIGNING AN INTERACTIVE SYSTEM

(75) Inventor: Kristinn R. Thorisson, New York, NY (US)

(73) Assignee: Soliloquy, Inc., New York, NY (US)

( * ) Notice: Subject to any disclaimer, the term of this patent is extended or adjusted under 35 U.S.C. 154(b) by 875 days.

(21) Appl. No.: 09/737,426

(22) Filed: Dec. 15, 2000

(65) Prior Publication Data

US 2002/0077726 A1 Jun. 20, 2002

(51) Int. Cl.[7] ............................................. G06F 17/50
(52) U.S. Cl. .......................... 703/1; 706/19; 715/500.1
(58) Field of Search ........................ 703/1, 13; 706/19, 706/20, 292; 715/500.1; 705/1

(56) References Cited

U.S. PATENT DOCUMENTS

| 5,159,249 | A |   | 10/1992 | Megherbi ................ 318/568.1 |
| 5,247,651 | A | * | 9/1993 | Clarisse ........................ 703/13 |
| 5,604,886 | A |   | 2/1997 | Kawashima et al. ........ 395/500 |
| 5,835,901 | A | * | 11/1998 | Duvoisin et al. ............. 706/19 |
| 5,999,908 | A | * | 12/1999 | Abelow ........................ 705/1 |
| 6,470,482 | B1 | * | 10/2002 | Rostoker et al. ............... 716/6 |
| 6,694,482 | B1 | * | 2/2004 | Arellano et al. ......... 715/500.1 |

OTHER PUBLICATIONS

A Mind Model for Multimodal Communicative Creatures & Humanoids, K. R. Thórisson, Int'l. Journal of Applied Artificial Intelligence, Aug. 1998, 31 pages.

Real-Time Decision Making in Multimodal Face-to-Face Communication, K. R. Thórisson, Second ACM International Conference on Autonomous Agents, May 11-13, 1998, pp. 16-23.

Layered, Modular Action Control for Communicative Humanoids, K. R. Thórisson, Computer Animation '97, Jun. 5-6, 1997, pp. 134-143.

* cited by examiner

Primary Examiner—Albert W. Paladini
(74) Attorney, Agent, or Firm—Jones Day

(57) ABSTRACT

A method of effectively designing an interactive system is disclosed. The method may preferably include the steps of (1) determining the overall scope of the desired interactive system, including available sources of input and output; (2) creating a list of desired features for the system; (3) creating a rough outline of perceptions, decisions, and actions that the system must be capable of if it is to possess the desired features; (4) designing perception features that implement the identified perception specifications and decision features that implement the decision-making process required by the identified decision specifications; (5) creating any necessary supporting components (e.g., buffers for storing data collected by perception features) to implement the perception and decision features; and (6) creating a behavior feature hierarchy that includes the action features required to implement action features of the interactive system. Each perception feature and decision feature is preferably assigned a priority level which may be a function of several factors. The present method may find particular application in designing an interactive system that implements an anytime algorithm and in designing an interactive system that implements a distributed, asynchronous architecture.

30 Claims, 4 Drawing Sheets

METHOD FOR DESIGNING AN INTERACTIVE SYSTEM

FIELD OF THE INVENTION

The present invention relates to designing interactive systems such as robots or virtual robots having interactive graphical interfaces.

BACKGROUND OF THE INVENTION

Conventional automated machines (e.g., robots) are designed to perform repetitive tasks. For instance, an automobile assembly line may include a phalanx of welding robots, each of which is programmed to weld specific parts. Since the robots are capable of welding the parts precisely and consistently, automobiles can be efficiently manufactured. However, such welding robots are not interactive. In other words, the welding robots are configured to carry out specific tasks only. They are not designed to work interactively with a person. Spatial operations of such welding robots are typically defined using a Cartesian coordinate system or other rigid mathematical coordinate systems, such as shown in U.S. Pat. No. 5,159,249 to Megherbi.

In contrast to the relatively rigid systems described above, intelligent systems are able to react in many ways to their surroundings, in a manner similar to the way a human or animal might react. Such a system may converse with a person or receive and carry out verbal commands from a person. An exemplary communicative interactive system is an embodied agent (physical or virtual robot) designed to receive input information from a person and from its environment, and act on the input information dynamically and adaptively. This type of interactive system may employ a graphical user interface displayed on a computer monitor and configured to receive input information using the computer's input devices.

One example of an interactive system is the communicative interactive system described in K. R. Thórisson, "Real-Time Decision Making in Multimodal Face-to-Face Communication," 2nd ACM International Conference on Autonomous Agents, Minneapolis, Minn., 1998, which is hereby incorporated by reference. As discussed in that paper, a designer should preferably consider a number of characteristics in designing an interactive system. For example, the designer should consider: 1. Types of inputs (e.g., data from various input sources that may be received and combined); 2. Types of outputs (e.g., voice output, motor action, and the like); 3. Input-output relationships (e.g., some outputs may be more reactive than others); 4. Timing constraints (e.g., in having a dialog); 5. Whether a single act may serve different conversational functions and whether different acts can serve identical conversational functions; and 6. A conversation participant's decisions to act (or not act) based on multiple sources, both internal and external, including body language, dialogue state, task knowledge, and the like. Preferably, an embodied interactive system like the one described by Thórisson is programmed so that it knows how to talk, listen, think, and act.

The above discussed characteristics are only a subset of the characteristics that should be considered in designing and implementing an interactive agent. Moreover, as the interactive system to be designed becomes more complicated, the number of characteristics to consider may increase significantly. As a result, designing such a system may become an unmanageable task.

SUMMARY OF THE INVENTION

The present invention provides a method of effectively designing an interactive system. In a preferred embodiment, the present method includes the following steps.

First, the designer determines the overall scope of the desired interactive system, including available sources of input and output. These are typically a function of the context in which the system will be used. For example, for an autopilot system, possible input sources include radar sensors, wind speed indicators, and altimeter readings, while system output may represent a change of aircraft direction.

Second, the system designer creates a list of desired features for the system. For example, for an autopilot system, desired features might include the ability to stay clear of objects in its path.

Third, the designer creates a rough outline of perceptions, decisions, and actions that the system must be capable of if it is to possess the desired features. For example, to steer clear of an object, the system must be able to detect an object and how far away it is (a perception feature), decide whether a turn is necessary (a decision feature), and if the decision is positive, turn away from the object (an action feature).

Fourth, the designer designs perception features that implement the identified perception specifications and decision features that implement the decision-making process required by the identified decision specifications. Typically, each decision feature receives output from one or more perception features and uses that output to reach a particular decision. For example, the autopilot decision feature may be designed to decide that a turn is necessary if an object is detected less than 500 meters straight ahead.

During this step, each perception feature is preferably assigned a priority level. In a preferred embodiment, the priority level assigned to a particular perception feature is a function of several factors including the amount of time required to gather necessary perception data, the amount of time required to process the collected perception data, the amount of input data required by the feature, the relationship between this perception feature and other perception features, and the amount of time required to make one or more decisions that are based on perceptions generated by this perception feature. The assigned priority level is used by the run-time system to load-balance the execution of perceptual and decision processes under time constraints, and to select among conflicting actions recommended by two or more decision features.

Each decision feature is similarly assigned a priority level. In a preferred embodiment, the priority level assigned to a particular decision feature is a function of several factors including the time required to perform one or more actions that result from the decision, the nature of the decision, and the priority level of perception features that provide input to this decision feature.

Fifth, the designer creates any necessary supporting components (e.g., buffers for storing data collected by perception features) to implement the perception and decision features.

Sixth, the designer creates a behavior feature hierarchy that includes the action features required to implement action features of the interactive system. In a preferred embodiment, during this step, the designer identifies one or more desired behavior nodes. A behavior node is a collection of one or more actions (movements) to be performed by the interactive system. Action features are then designed to perform the actions making up the behavior nodes, specifying the lowest-level specifics of how they are to be performed.

The decision-feature output specifies the particular action to be taken by the action feature. For example, if an autopilot decision feature determines that the aircraft should execute a 30 degree left hand turn, an action feature may implement that decision.

Once these steps are completed, the design may be tested to determine whether it performs adequately and provides the desired features identified in the first step. If necessary, the design may then be refined to address any inadequacies.

In a preferred embodiment, the present method may find particular application in designing an interactive system that implements an anytime algorithm. As known in the art, an anytime algorithm is an algorithm that improves its output linearly over time, i.e. returns the best answer possible at any point in time, even if it is not allowed to run to completion, and continues to improve on the answer if it is allowed to run longer. In a preferred embodiment, the present method may also find particular application in designing an interactive system that implements a distributed, asynchronous architecture. Each feature and/or groups of features can be modeled as independent computing elements and processes and implemented on separate processors, computing elements, or platforms.

BRIEF DESCRIPTION OF THE DRAWINGS

The above summary of the invention will be better understood when taken in conjunction with the following detailed description and accompanying drawings, in which.

DETAILED DESCRIPTION OF THE PREFERRED EMBODIMENTS

Figure 1:
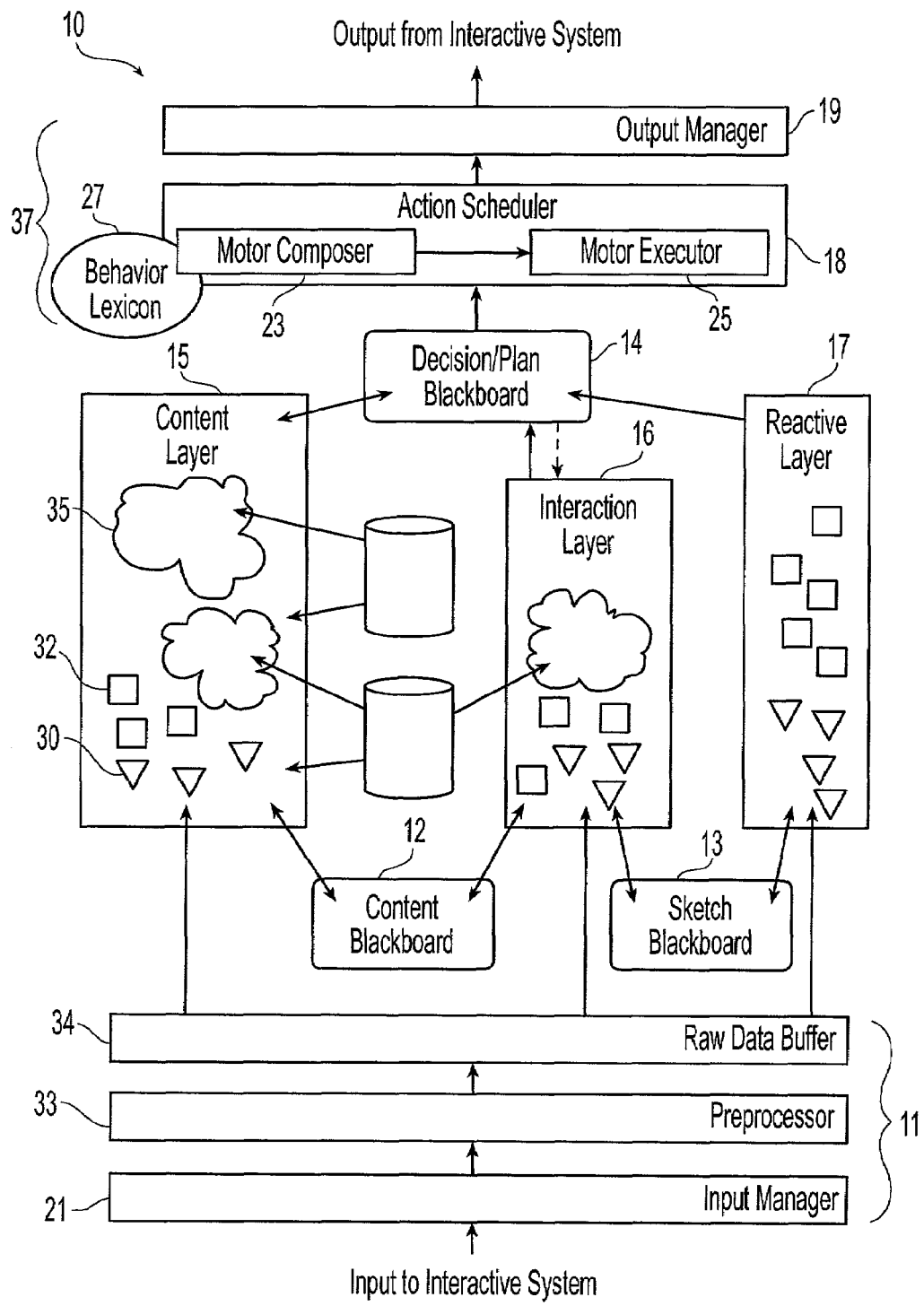
FIG. 1 is a block diagram of an exemplary interactive system that may be designed using the present method.

Before describing preferred embodiments of the present method, an exemplary interactive system 10, which may be designed using the present method, is first described in connection with FIG. 1. As shown in FIG. 1, system 10 preferably comprises an input feature 11, a number of buffers 12, 13, 14 called "blackboards," a number of groups of processing features called processing "layers" 15, 16, 17, an action scheduler 18, and an output manager 19. These components (and their sub-components described below) may preferably be implemented as computer software, computer hardware devices, mechanical devices, or a combination of these.

It should be noted that the exemplary interactive system shown in FIG. 1 may be implemented in a client-server environment (e.g., the Internet). For instance, processing features 15, 16, 17, blackboards 12, 13, 14, and action scheduler 18 may be located on a server computer while parts of input manager 11 and output manager 37 are located on a client computer. In this configuration, system output may be displayed on a client monitor while most system processing takes place at a remote server.

Input module 11 receives input signals from a user and perception signals from various sensors such as visual sensors, auditory sensors, balance sensors, touch-sensitive sensors, radar sensors, sonar sensors, and the like. The received input signals are processed by layers 15, 16, 17 and intermediate results from them are stored in blackboards 12, 13, 14. Subsequently, action scheduler 18 and output manager 19 generate output based on the processed data as it becomes available.

Input module 11 preferably includes an input manager 21, and may include a pre-processor 33, and a raw data buffer 34. Input manager 21 is configured to receive a set of plug-in input devices such as a keyboard, a mouse, a microphone, a touch sensitive screen, interactive gloves to monitor hand gestures, arm gestures, etc., and/or other similar devices. In another embodiment, input manager 21 may also be configured to receive input from both active and passive sensors, including optical sensors, radar sensors or sonar sensors. Input manager 21 is further configured to collect raw data from signals received from input devices. Input manager 21 may time stamp all incoming raw data and may forward it to preprocessor 33 for preprocessing before it is stored in raw data buffer 34.

Interactive system 10 may also include a number of perception features 30, decision features 32 and knowledge features 35. Perception features retrieve data stored in raw data buffer 34 and generate necessary information for output to decision features. For instance, in a talking head embodiment, the system may need to determine when a user finishes asking a question so that it can respond to it promptly. Accordingly, a perception feature may retrieve necessary tokens stored in raw data buffer 25 and provide such data to an appropriate decision or knowledge feature. The decision feature determines whether the user has finished asking his or her question and selects an appropriate action feature.

Each perception feature 30 and decision feature 32 is preferably assigned to one of three processing layers: a reactive layer 17, an interactive layer 16, or a content layer 15. Reactive layer 17 preferably contains features that are part of processes having a perception-to-action loop time of approximately 100–500 milliseconds. Perception-to-action loop time is the length of time required to generate an output (selecting or composing an action feature) from when an input is received by a perception feature until the resulting action starts. Actions that belong to this category are for example actions that can—when exhibited by humans—be brought under voluntary control (i.e., they are not pure reflexes), is including fixations, eye blinking, back-channel feedback (e.g., saying "mhm" or "aha" when listening to someone speak), but typically occur "automatically" without deliberate intervention. In contrast, interaction layer 16 preferably contains features that are part of processes having a perception-to-action loop time of approximately 500–1000 milliseconds. These are typically "task-level" actions such as picking up a cup, adjusting one's glasses, or deciding when to speak. Finally, content layer 15 contains features that are part of processes typically referred to as "intelligent" processes. These processes are typically directed to relatively static knowledge of the world such as understanding of natural language, social situations, and special topics, and typically do not have a perception-to-action loop time under one second.

Importance or priority in this context typically refers to time specificity: If a perception, decision, or other feature is related to functioning of the interactive system that is heavily constrained by time, such as avoiding being hit by a flying ball, the feature is of high importance/priority and is preferably assigned to the reactive layer. Assignment of a feature to a particular layer may also be made as a function of other factors, as described in more detail below.

Interactive system 10 also preferably includes support systems, including three blackboards: a sketch blackboard 13, a content blackboard 12, and a decision/plan blackboard 14. Blackboards 12, 13, 14 receive messages from various process layers 15, 16, 17, store various messages for data requests, and allow the stored messages to be based on various criteria such as time periods, content types, message types (e.g., text, input from a mouse, speech), identity of the sender, or other data. The interface to blackboards 12, 13, 14 may be a simple get/put mechanism, implemented in a message format. The messages in these calls may, for example, be object-encapsulated XML or Lisp-like structures.

Content blackboard 12 services data flow between processes in content layer 15 and interaction layer 16. It functions as a repository for perception data that has been produced by user actions (i.e., from raw data buffer 25), decisions based on perception data, and plans and status reports generated by various other internal components (e.g. knowledge feature 35). Sketch blackboard 13 stores rough sketches of perceived input. These are perceptions that are typically produced quickly and early in the processing of incoming data events, and may not require strict accuracy (because reliability is achieved in higher-level processes such as knowledge feature 35) but require fast (i.e. reactive) responses. These perceptions are typically broad strokes about the general situation of the environment that the interactive system is situated in, as defined by its possible inputs from input manager 21. Decision/plan blackboard 14 receives decisions produced by decision features in all layers.

Action scheduler 18 comprises a motor composer 23, a motor executor 25, and a behavior library 27 which contains a tree of behavior nodes, time-sequenced actions, and motor leaves. The term "motor" describes a feature that carries out any action, whether it involves actual physical motion or virtual motion (in the case, for example, of computer graphics). Motor composer 23 takes a portion of the plans and decisions (that span less than 2 seconds) from decision/plan blackboard 14 and determines the optimal way to execute them, based on the current status of the system and, particularly, on the status of output.

The output of motor composer 23 is a motor program that may identify any number of motors moving over some period up to approximately one or two seconds. Motor executor 25 takes this motor plan and executes it (sends its motor commands to a motor system) in chunks of approximately 100 milliseconds. Actions performed by the system may include: generating speech, generating text, generating phonemes, generating intonation, and generating an animated or physical movement. An animation may include animation of facial expression, animation of body movement, animation of hand gestures, animation of arm gestures, and animation of visemes. Physical movements may include the same examples. One of the main tasks of motor composer 23 and motor executor 25 is to synchronize actions in different modes that are preferably executed together (e.g., speech output synchronized to lip movements and facial expressions), and to prioritize decisions and plans to identify the most important. Output manager 19 ensures the 100 millisecond periods of motor commands coming out of motor executor 25 are executed correctly. Behavior lexicon 27 contains a collection of actions or motions that the interactive system may undertake. For instance, it may contain a list of answers prepared for specific types of questions that the user of the interactive system may ask, or specific rules about how to compose a speech and gesture combination.

Figure 2:
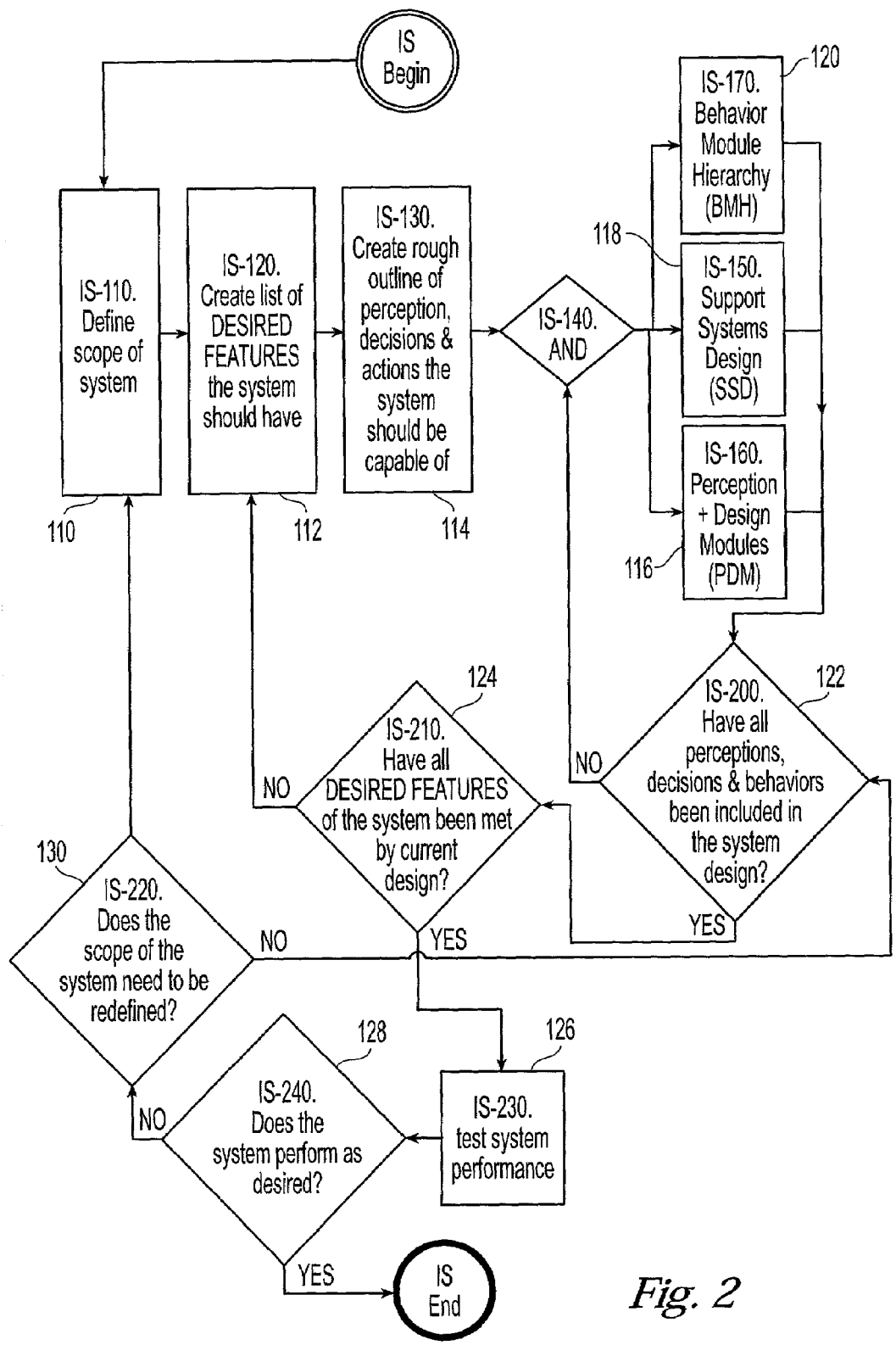
FIG. 2 is a flow chart of a preferred embodiment of the overall design process of the present method.

Turning to FIG. 2, a preferred embodiment of the present method for designing an interactive system, such as interactive system 10 of FIG. 1, will now be described. The result of the preferred design process described herein is a set of perception, decision, and action features for an interactive system.

In step 110, the overall scope of the interactive system is determined utilizing the global context in which the interactive system is to be used. For example, if the interactive system is to be used over the Internet, the scope of system interaction with its environment may be limited by available input technologies (e.g., keyboard, speech recognition, and mouse), and available output technologies (e.g., computer display and audio). If the interactive system is an interactive robot configured to carry out commands issued by its owner, the scope of the interaction may include receiving voice commands, perceiving the surrounding environment, and carrying out the commands.

In step 112, a list of desired features of the system is generated. The list of desired features preferably includes an enumeration of the elements that make up the "mental" and "physical" capabilities of the system. During this step, the basic input, output, and behavior characteristics of the interactive system are generated. For example, if the behavior characteristics of a talking head are to be generated, the list of desired features may include a graphical representation of a human head with certain type eyes and ears. Such a list may also include human-mind-like capabilities with navigational skills, speech capability, social manners, and the like.

In step 114, an outline of perceptions, decisions, and actions needed to realize the desired features is generated. This outline may be created using any combination of the following: (1) deduction from steps 110 and 112 (e.g., the talking head system may require a perception system to understand human speech, a decision system to make decisions how to respond to input received from its user, and an action system to output a voice message); (2) biological research results or anatomy studies (e.g., how different facial muscle groups move with or against each other to make various lip movements and human facial expressions); and (3) psychological experimental results for the kind of interactive system being developed (e.g., depending upon the input from its user, the facial expression of a talking head may manifest sadness, happiness, deep thinking, perplexedness, and the like. These may be generated using social cues such as facial expressions and verbal cues necessary to conduct social discourse or behave with proper etiquette in social gatherings and the like).

In step 116, perception and decision features required to implement desired system specifications are designed. Also during this step, each perception and decision feature is assigned a priority, as mentioned in relation to interactive system in FIG. 1, and described in more detail below. In a preferred embodiment, features may be assigned one of three priorities: high, intermediate, and low. In the preferred embodiment of FIG. 1, these correspond to the reactive layer, interaction layer and content layer, respectively.

The choice of priority level for a particular feature may take into account a plurality of factors. As described below in relation to FIGS. 3 and 4, some of these factors are typically more important than others so that they play a greater role in determining the priority level of a feature. In addition, some factors may have special significance in particular cases and completely determine the priority level to which a feature is assigned.

In a preferred embodiment the factors considered in assigning priorities and their relative importance are identified in an iterative process. In particular, in designing a system, the designer first articulates particular factors to be considered in assigning priority and uses those to assign priority levels to features. The system is then tested, as described in step 126, to determine whether it behaves as desired. If not, inadequacies associated with feature priority levels may be addressed by adjusting the types, relative importance, and interaction of factors used to assign priority levels to the relevant features.

The assigned priority is utilized by the system for two main purposes: (1) To load-balance the running of perception features and decision features under time-constraints and normal system functioning; and (2) to select among actions before they are performed, for example if they conflict in time or in the resources they require (e.g., if they require the same or an overlapping set of motors—see definition of 'motor' above). In a preferred embodiment features are grouped according to their priority and assigned to a particular processing layer: All features assigned high priority are placed in the reactive layer; all features assigned intermediate priority are placed in the interaction layer; and all features assigned low priority are placed in the content layer. It should be noted that the present invention is not limited to providing three priority levels; certain load-balancing schemes may work better with more levels.

In step 118, supporting system components are designed. The supporting components may include: (1) data buffers (e.g., blackboards); (2) a mechanism to allow the perception and decision features to post information in the buffers; (3) a mechanism that allows perception and decision features to read information from the blackboards; (4) specification of types of messages to be posted in the buffers.

In step 120, a behavior module hierarchy for the interactive system is designed, as described in more detail below in connection with FIG. 4.

In step 122, it is determined whether or not all required perception, decision, and action features have been included in the system design. If they have not, the above described steps are repeated. Otherwise, in step 124, it is determined whether or not all desired features of the system are met by the current design. If not, remaining desired features are generated by repeating steps 112 through 120. Otherwise, in step 126, the system's performance is tested. In step 130, if the system performs as desired the system design is complete; if not, whether or not the scope of the system needs to be redefined is decided (step 128). If yes, then the scope is redefined by going back to step 110; if no, system flow returns to step 122.

Figure 3:
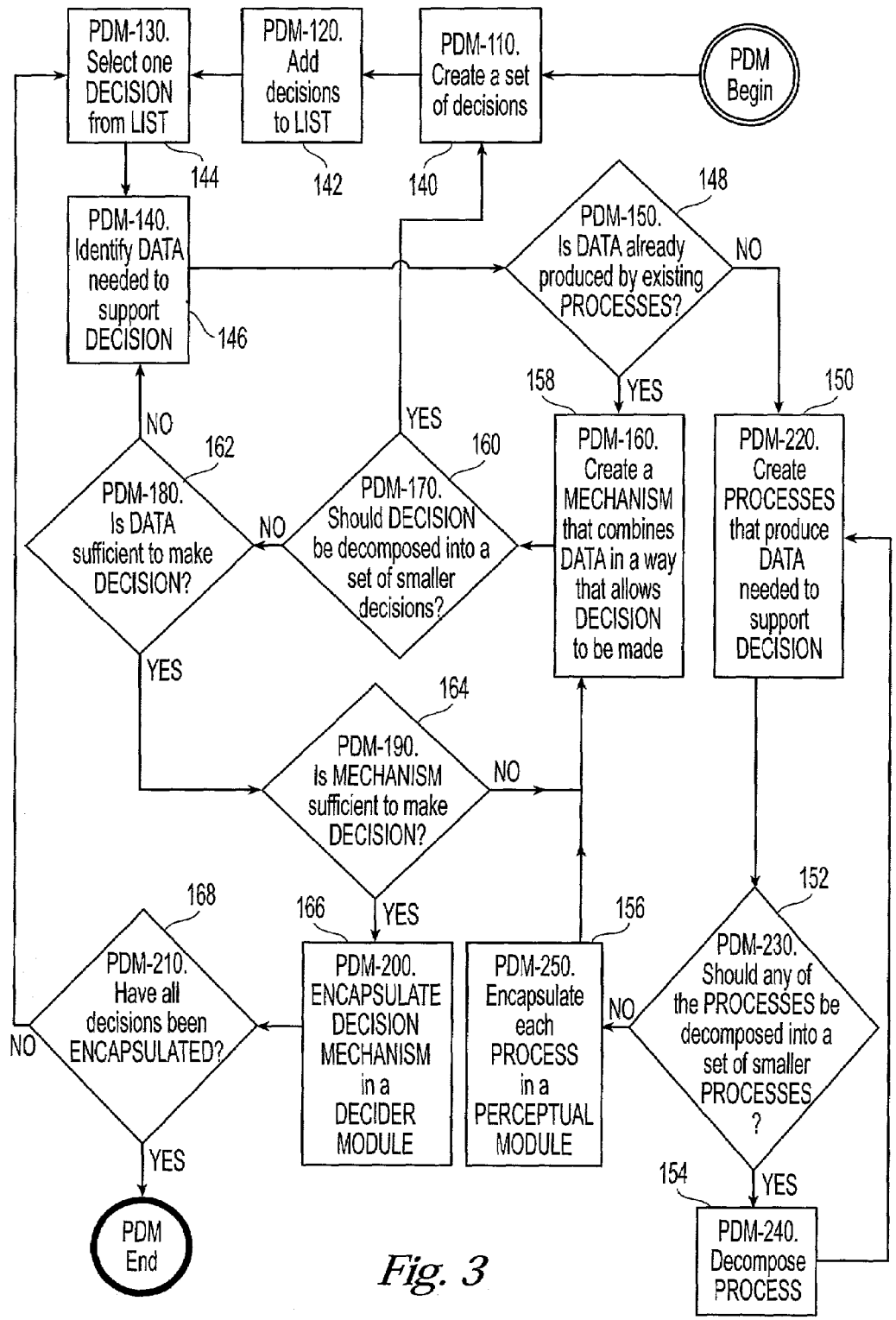
FIG. 3 is a flow chart depicting a preferred embodiment for designing perception and decision features.

FIG. 3 is a flowchart that depicts step 116 of FIG. 2 in further detail. Turning to FIG. 3, in step 140, a set of required decisions is created, typically by examining behaviors that the interactive system is to exhibit, as outlined in step 114. For instance, a talking-head interactive system may exhibit a variety of speech behaviors. To implement these behaviors, the system must know when to speak, what to say, how to say it, and the like. From this, the need for certain decisions may be derived. For example, the system may be required to make a "speak-now" decision that determines when it is time to speak and a "produce-speech-content" decision that determines what should be said. Thus, for example, content produced following the "produce-speech-content" decision may be played to a user when the "speak-now" decision indicates that it is time to speak.

In step 142, the set of decisions is added to a list of available decisions. In step 144, one decision from the list is selected. In step 146, the type of data required and available to support the selected decision is identified. The type of data available is largely a function of available input technologies such as sensors and input devices. For example, if one system behavior requires the system to say "hello" when a person is nearby, and a motion detector is available to provide input to the system, then the designer may decide that a positive output from the motion detector represents sufficient data to cause a decision that the system should say "hello."

In step 148, it is determined whether or not the system already comprises one or more perception processes that generate the required data. If it does, then the output from those processes may be used for the decision and no additional perception processes are necessary to support this decision. Flow in this case, proceeds directly to step 158, described below. Otherwise, in step 150, an additional perception process is defined for producing that data.

In steps 152 and 154, if the process is overly complex, it is decomposed into smaller processes. Steps 150, 152, and 154 are repeated until an optimal level of complexity in the created processes is achieved.

In step 156, each perception process defined in steps 150–154 is encapsulated in a perception feature. The perception features are each assigned a name, number, or other identifier. During operation of the interactive system, these perception features produce output that is posted to a buffer and subsequently used as input in reaching one or more decisions, or for further perceptual processing.

In step 158, a mechanism is created that aggregates the data produced by the perceptual features defined in steps 150 through 156, processes it, and makes a decision. This mechanism may be implemented using boolean logic, fuzzy logic, neural nets, heuristic algorithms, or other methods known in the art.

In step 160, whether or not the selected decision should be decomposed to achieve an optimal complexity level is determined. If such decomposition is desirable, the steps starting from step 140 are repeated. If no further decomposition is desirable, it is determined (in step 162) whether or not the data from the perception features is sufficient for the selected decision. If not sufficient, then the steps starting from step 146 are repeated. If sufficient, it is determined whether or not the created mechanism is sufficient to support the selected decision (step 164). If the created mechanism is not sufficient, then the steps from step 158 are repeated. If the created mechanism is sufficient, then the decision mechanism is encapsulated in a decision feature (step 166). The decision feature is given a name, number, or other identifier. In step 168, whether or not all decisions have been encapsulated is determined. If not, the steps from step 144 are repeated. If yes, this portion of the system flow is completed.

As discussed above, the priority level of a feature (and, hence, the layer to which it is assigned) may be a function of a plurality of factors. The factors used to determine decision feature priority levels and perception feature priority levels include, but are not limited to, those listed below.

The choice of priority level (layer) for a perception feature may be made on the basis of a plurality of factors including: (1) processing time; (2) data time span; (3) input data; (4) whether or not other perception features have already produced output relevant to the perception feature; and (5) the relationship between the perception feature's output and the types of decisions the output may support.

SUPPORTED PERCEPTION-TO-ACTION LOOP TIME: If the processing time of the raw or partly processed input data supports a perception-to-action loop time of less than 500 milliseconds, this factor supports assigning a high priority to the perception feature. If the processing time of the feature's data can typically (or only) support a perception-to-action loop time of 1500 milliseconds or longer, this factor supports assigning a low priority to the feature. A perception-to-action loop time between 500 and 1500 milliseconds points to assigning the perception feature a medium priority.

DATA TIME SPAN: If the time it takes to gather the data needed to produce an output for a decision feature is approximately 300 milliseconds or less, this factor supports assigning the perception feature a high priority. A data-gathering phase spanning approximately 300–1500 milliseconds supports assigning the perception feature a medium priority; and a highly variable data gathering phase or one extending longer than 1500 milliseconds supports assigning the perception feature a low priority.

INPUT DATA: If the data needed for a perception feature to produce output is simple and/or very small (e.g., one data entry, or very few data entries, from a single sensor) and/or exists as raw (unprocessed) data, this factor supports assigning the perception feature a high priority. If the perception feature requires a combination of a relatively large amount of different data from different sensors and/or from other perception features, and/or from various parts of the interactive system, including the context of the interaction, this supports assigning the perception feature a medium or low priority.

RELATED PROCESSING: If various perception features have already been designed to produce output that can be used in a new perception feature's processing, this factor supports assigning the new perception feature the same priority or a lower priority as those perception features, and permitting the new perception feature to use the output of the other perception features as much as possible. In a preferred embodiment, perception features assigned a low priority may receive as input the output of other medium or low priority perception features, but may not receive as input the output of high priority perception features.

SUPPORTED DECISION/PROCESS: If the output of a perception feature is needed for a decision whose resulting action takes less than 500 milliseconds to perform, this factor supports assigning the perception feature a high priority. If the output supports a decision feature whose resulting action takes between 500 and 1500 milliseconds to perform, this supports assigning a medium priority to the feature. Output used for a decision directly related to interactions between the interactive system and its user supports assigning the perception feature a medium priority. Output used for complex and/or knowledge-based processing such as high-level decision making or processing (e.g., complex natural language processing or planning ahead) in the topic domain supports assigning the perception feature a low priority. If the output of the perception feature support a decision whose resulting action takes longer than approximately 1500 milliseconds to perform, this too supports assigning the feature a low priority.

REQUIRED PERCEPTUAL PROCESSING: If the processing that the perceptual feature performs is difficult or impossible to decompose further into smaller perceptual features, resulting in a relatively large, complex process, and/or the perception feature requires complex data or knowledge structures to support its processing, and/or the output of the feature is itself a complex data or knowledge structure, this supports assigning a low priority to the feature. If the processing time of the perception feature necessary to produce output is less than approximately 300 milliseconds, this supports assigning a high priority to the feature. If the processing time of the perception feature necessary to produce output is approximately between 300 milliseconds and 1500 milliseconds, this supports assigning a medium priority to the feature. If the processing time of the perception feature necessary to produce output is greater than approximately 1500 milliseconds, this supports assigning a low priority to the feature.

In a preferred embodiment, priorities map onto processing layers in the following way: high priority maps to reactive layer 17, medium priority maps to interaction layer 16, and low priority maps to content layer 15. In a preferred embodiment, all three layers are preferably provided with roughly an equal number of features.

The choice of priority level (layer) for a decision feature may be made on the basis of a plurality of factors including: (1) data input source; (2) number of inputs; (3) nature of decision and/or processing; (4) amount of preplanning needed before decision can be made; (5) time it takes to perform the action resulting from the decision; and (6) number of motors required to perform the action resulting from the decision.

PRIORITY OF INPUT SOURCE: If perception information (or output from other decision features) needed to make a decision is available or can be made available by creating a perception (or decision) feature with a high priority, according to the rules for perception features (or the rules for decision features) described below, this factor supports assigning the decision feature a high priority or medium priority. If the data needed for a decision is produced by a feature with medium priority, this factor supports assigning the decision feature either a medium or low priority. If the data needed for a decision is produced by a feature with low priority, this factor supports assigning the decision feature a low priority.

NUMBER OF INPUTS: Another factor influencing the priority level of a decision feature is the number of inputs it receives. This factor preferably functions along a continuum, such that if a decision feature receives input from relatively few other features, the factor supports assigning the feature a high priority. If the decision feature receives input from a larger number of features, or from complex knowledge processes, the factor supports assigning the decision feature a low or medium priority.

NATURE OF DECISION/PROCESSING: If the decision to be made by a decision or processing feature is related to content or topic of a dialogue, this supports assigning the feature a low priority; if the feature is clearly related to hand-holding of the dialogue (e.g., turn taking in speaking), this supports assigning the feature a medium priority. In addition, if the decision to be made requires relatively complex processing, this factor supports assigning the feature a low priority. In contrast, if the decision to be made requires relatively simple processing, this factor supports assigning the feature a medium or high priority. If the decision is related to a knowledge-based topic other than the interaction itself, this supports giving the feature a low priority.

PREPLANNING: The preplanning factor may also operate along a continuum, such that large amounts of preplanning support assigning a low priority level to the decision feature. Small or no amounts of preplanning support assigning a high priority level to the feature. Intermediate amounts of preplanning support assigning a medium priority level to the decision feature.

DURATION OF ACTION: If the typical duration of an action resulting from a particular decision is approximately 500 milliseconds or less, this factor supports assigning the decision feature a high priority. An action duration of approximately 500 to 2000 milliseconds supports assigning the decision feature a medium priority, and an action duration of approximately 2000 milliseconds or more supports assigning the decision feature a low priority. (It should be noted that these time estimates are based on the assumption that perception and decision features run in parallel—i.e. that the total number of features does not affect the processing or execution speed.)

SIMPLICITY/COMPLEXITY OF RESULTING ACTION: If the action resulting from a particular decision is a simple action requiring few motors to perform, this factor supports assigning the decision feature a high priority. If the action resulting from a particular decision is a more complex action requiring many motors to perform, this factor supports assigning the decision feature a medium or low priority.

In a preferred embodiment, factors related to the nature of the decision to be made (e.g., amount of required pre-planning) play generally a larger role than factors relating to inputs required by the decision feature (e.g., priority level of input sources) and factors relating to actions resulting from the decision (e.g., duration of resulting action factor). For example, a decision feature requiring a significant degree of pre-processing may preferably be assigned a low priority level even if it receives input from perception features assigned a high priority level. Similarly, a decision feature resulting in an action that has a short duration, but requiring considerable pre-processing, will preferably be assigned a low priority.

Figure 4:
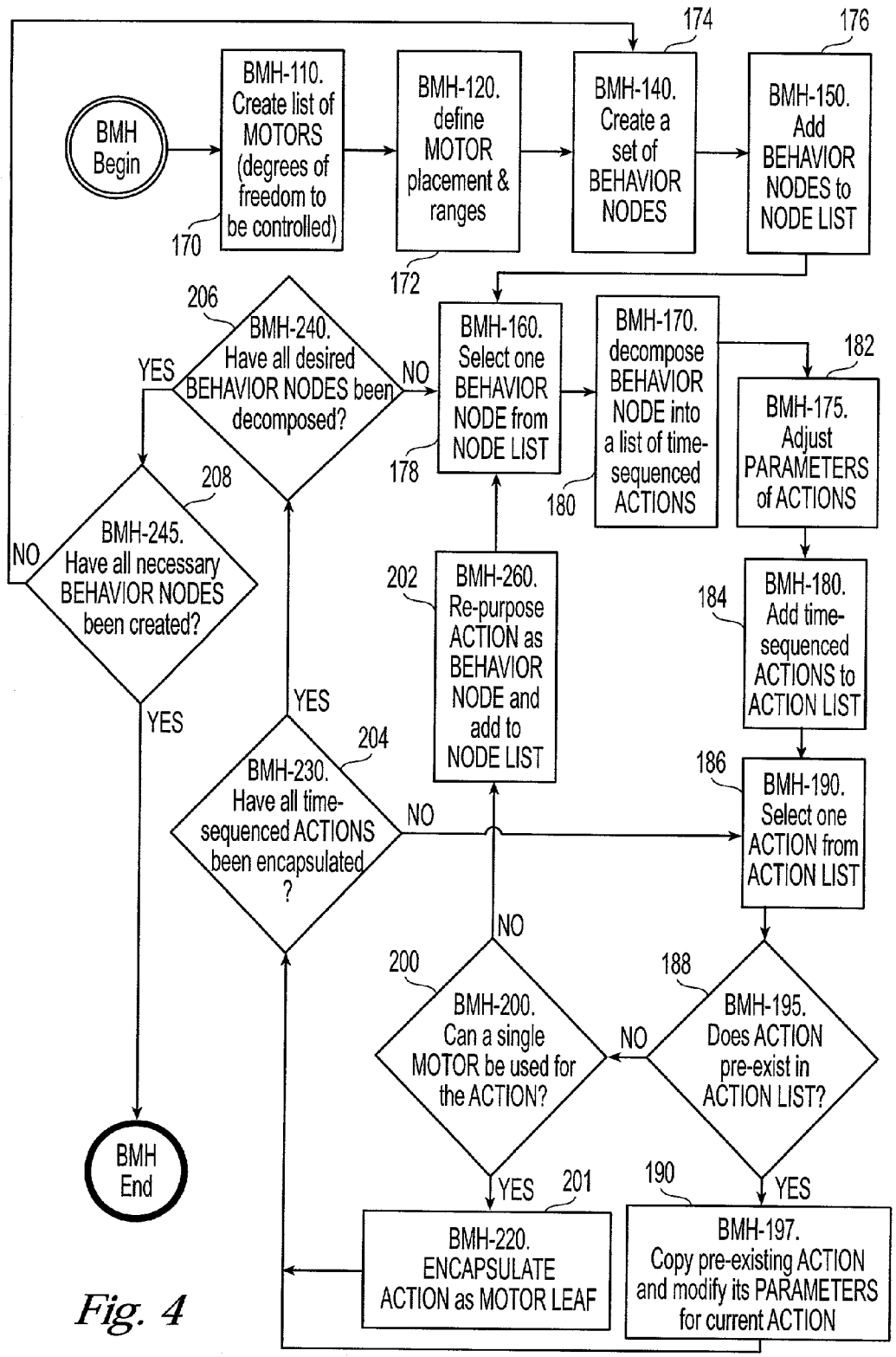
FIG. 4 is a flow chart depicting a preferred embodiment for designing a behavior hierarchy.

FIG. 4 is a flowchart that depicts step 120 of FIG. 2 in further detail. As noted above, in step 120, a behavior module hierarchy for the interactive system is designed.

In step 170, a list of motors is created. The list contains information directed to the degrees of freedom to be controlled for each listed motor. Motors include any part of the interactive system that has to move or affect the world in a time-sensitive manner. Examples of motors include the pneumatics of a robot or the muscles of a creature that give it the ability to move (e.g. walk, speak, type words and sentences, look in a certain direction, close one or more eyes and blink, grasp and manipulate objects, and the like). As briefly noted above, when the interactive system is a virtual robot to be displayed on a computer monitor, the motors control how the virtual robot behaves (e.g., its movements) on the monitor. In other words, the motors are virtual motors in that embodiment.

In step 172, each motor's placement and range are defined by specifying how far a given motor may move, and where it is placed on the robot's body. For example, a motor placed above the eye of a talking head (placement) may preferably be adapted to close and open the eye fully (range).

In step 174, a set of behavior nodes is created. A behavior node is a collection of one or more actions to be performed by the interactive system. These behavior modes may be created by: (1) using an existing set of decision features, as defined in the process description of FIG. 3, if they exist; and/or (2) using the rough outline of actions created in step 114 above. For example, if the rough outline includes a decision feature for making a decision regarding when to smile, or the ability to smile, a behavior node called "smile" may be created.

In step 176, the created behavior node is added to a list of behavior nodes. In step 178, one of the nodes from the list of behavior nodes is selected. In step 180, the selected behavior node is decomposed into time-sequenced actions by identifying one or more events that together achieve the action specified in the behavior node. For example, decomposition of the "smile" behavior node may result in a list of three time-sequenced actions: "pull-left-corner-of-mouth-up-and-out," "pull-right-corner-of-mouth-up-and-out," and "squint-slightly." The actions may have different onset times. For example, squinting may start 200 milliseconds later than the mouth actions. In step 182, parameters of an action are adjusted by specifying (1) the length of time required to execute the action and, optionally, (2) its motion characteristics.

In step 184, the time-sequenced actions are added to an action list. In step 186, one action from these time-sequenced actions is selected. In step 188, whether or not the selected action already exists on the action list (i.e., has previously been encapsulated as an action feature) is determined. If the selected action exists on the action list, the existing action is copied and its parameters are adjusted for the selected action (step 190). For example, if the selected action is called "happy," and an existing action is called "very-happy," the latter might be used for the purposes of "happy" by adjusting its parameters and changing the position of its motor.

If the action does not already exist on the action list, then, in step 200, whether or not a single motor can be used for the selected action is determined. An exemplary action requiring one motor is a "wink" action that may use a "Upper-Right-Eyelid" motor. An exemplary action requiring more than one motor is a "squint-slightly" action which may, for example, include the use of four motors: "Upper-Right-Eyelid," "Lower-Right-Eyelid," "Upper-Left-Eyelid," and "Lower-Right-Eyelid."

If the action requires more than one motor, the action is optionally recast as a behavior node, which is then added to the node list (step 202). Subsequently, the steps from step 178 are repeated. If the selected action requires only one motor, then the selected action is encapsulated as a motor leaf. More specifically, in step 201, the selected action is encapsulated as a named motor leaf which includes a collection of a data point of the form: <Name, Motor, Position, Parameters>. Name describes the movement in a human-readable way; Motor refers to the motor that is intended to move as defined in 170; Position refers to the end-position that the motor should be in after it has finished moving; and Parameters refers to the way (manner) in which the motor moves. For example, for a behavior node "Anger" the outer part of the left eyebrow may be pulled upwards. If the range of the motor is from 0–100 (all the way down to all the way up, respectively), a motor leaf called "Pull-Outer-Left-Eyebrow-Up" might be created, and given a position of 90. In this example a data point is created of the following form: <Pull-Outer-Left-Eyebrow-Up, LEL, 90, Parameters>, where LEL indicates the "Left Eyebrow Lateral" motor, and 90 is its end position. If the expression "Surprise" is transient (returns to neutral values after being executed), another motor node called "Outer-Left-Eyebrow-Neutral," may be created using the same MOTOR, and given a position of 50. Optionally, as part of the parameters, these motor leaves may be given a "time-to-run" value (measured, e.g., in milliseconds) which indicates how long it should take the motor leaf to move the motor to the desired position. Optionally, a further movement characteristic, in the form of an amplitude wave, may be specified for each motor leaf. The motor for that motor leaf may then move according to this amplitude wave.

In step 204, whether or not all time sequenced actions have been encapsulated is determined. If they have not, flow returns to step 186. Otherwise, flow proceeds to step 206, where it is determined whether or not behavior nodes have been decomposed to achieve an optimal complexity level. If further decomposition is desired, the steps from step 178 are repeated. If no further decomposition is desired, whether or not all necessary behavior nodes have been created is determined (step 208). If not, the steps from step 174 are repeated. If yes, the behavior module hierarchy design is completed.

Each action feature is preferably assigned a priority level. In one embodiment, actions that cannot be decomposed further (motor leaves) are assigned highest priority; more complex actions, i.e., actions on the action list, are assigned a medium priority, and behavior nodes on the node list are assigned lowest priority. Each of these can be requested to be triggered by a decision feature during run-time of the system, as explained below. In addition to helping achieve a particular perception-to-action loop time during run-time, the priority levels are used by action scheduler 18 in FIG. 1—when a particular decision feature has requested an action feature to be triggered—to determine which of conflicting behaviors should be triggered and executed first: The highest priority ones are executed first, the medium ones next, and the lowest priority ones last. The order of execution can be determined either by the priority of the action feature, or the by the priority of the decision feature that requested it to be triggered.

A more specific example of the above method, which relates to a "talking dragon," is now described. The talking dragon is a virtual robot (i.e., a computer-graphical representation of an imaginary talking dragon). This example illustrates that the present invention is not limited to modeling real-world items (e.g., humans) in designing interactive systems, but may also be applied to any hybrid interactive system with various input and output capabilities.

Such a talking dragon may be designed by applying the steps discussed above in connection with FIGS. 2–4. It should be noted that only salient steps are discussed below.

Referring to FIG. 2, in step 110, the scope of the interactive talking dragon is determined. The scope may specify aspects of the dragon such as its anatomy and capabilities. For example, the dragon's body may be designed to include eyes, ears, a body, two arms, two legs, two wings, and a tail. Its capabilities may include breathing fire and speaking. Since the talking dragon is a virtual robot, its physical features (e.g., eyes, wings, etc.) are represented by computer graphics. Furthermore, its speaking and listening capabilities may be implemented using a speaker and microphone, respectively. It may also have an optical sensor to determine an end-user's location and facial expressions.

In step 112, a list of desired features for the talking dragon is created. These may include: navigating, flying, walking, interacting with people (e.g., greeting, chatting, telling stories, laughing when amused), and breathing fire. For ease of illustration, the remainder of this description focuses on certain of these features (i.e., flying, walking, and interacting with people). It will be recognized, however, that the principles described below may be applied to any desired feature for the dragon.

In step 114, an outline of perceptions, decisions, and actions needed to realize the desired features is generated. Typically, each of the features identified in step 112 will require a set of relatively low-level perception, decision, and action features to implement. For example, flying may require perceiving altitude, direction, speed and other similar physical parameters. (In the present example, these measurements are all virtual measurements rather than physical measurements because the talking dragon "lives" in a virtual computer-graphics environment.)

Referring to FIG. 2, steps 116, 118, and 120 may be performed in any order. If the behavior module design (with its action features) is to be completed first, a list of all the muscles/motors (i.e., virtual motors) required to move the body is first created (step 170 in FIG. 4). For instance, one motor (pulling up and down) for each wing and two motors for the tail (moving it sideways and up-down) may be required. These motors are placed on the dragon's body. Each motor includes a definition of how far it can move (e.g., how far to the left the tail can go) (step 172). In the virtual environment, placing and operating virtual motors on the virtual dragon's body entails writing computer software that causes the graphical representations of different parts (e.g., virtual wings) of the dragon to move.

Referring to FIG. 4, in step 174, behavior nodes for the dragon are created. These may include: "walk," "move-right-leg-forward," "move-right-leg-backward," "move-left-leg-forward," "move-left-leg-backward," "flap-wings," "move-right-wing-up," "move-right-wing-down," "wings-neutral," "flap-tail," "flap-tail-fast," "flap-tail-slowly," and the like.

In steps 178 and 180, one of the behavior nodes (e.g., "flap-wings" ) is selected as the first behavior node to be decomposed into time-sequenced actions. The decomposition may result in the following sequence of actions: (1) moving the wings slowly all the way up, (2) and moving the wings rapidly all the way down, in a repeating fashion.

In step 182, parameters of an action are adjusted. These may include speed of action, desired end-position for the motor, and delay for each motor, if any. For example, the speed of each segment of the "flap-wings" actions (i.e., "move-up" and "move-down" ) may be set at 1000 ms upward motion and 500 ms downward motion. The range may be set at fully up to fully down, giving a triplet of the following kind:

[Move-Left-Wing-Up, 1000 ms, pos:100]
[Move-Left-Wing-Down, 500 ms, pos:0], where the last number is the position of the left-wing motor. Similar parameters are set for the right wing. The following is an exemplary set of actions for the right and left wings:

[Flap-Wings-Once, 1500 ms]
   [Move-Left-Wing-Up, 1000 ms, pos:100, delay:0 ms]
   [Move-Right-Wing-Up, 1000 ms, pos:100, delay:0 ms]
   [Move-Left-Wing-Down, 500 ms, pos:0, delay:1000 ms]
   [Move-Right-Wing-Down, 500 ms, pos:0, delay:1000 ms]

The delay parameter specifies that the downward motion of both wings should be delayed by 1000 ms, which makes it coincide with the termination of the upward motion. "Flap-wings-once" may then be triggered repeatedly by a decision feature to achieve a continuous flapping motion. In step 184, all actions are put into the action list.

In step 186, one action from the list (e.g., "move-left-wing-up") is selected. Assuming that this action does not yet exist in the action list (step 188), this action is encapsulated into a motor leaf, because only one motor is needed to realize it. The remaining actions are similarly encapsulated.

In step 206, the designer determines whether behavior nodes may be decomposed to achieve optimal granularity. For example, if the dragon is always to flap its wings while laughing, a "chuckle" behavior may be selected from the node list and decomposed into "open-mouth," "smilefriendly," "say-heh-heh" and "flap-wings." The coordination of these three events may then be adjusted by having the mouth open before the other three occur (step 182). When the "flap-wings" action is selected from the list (step 186), it is recognized that a similar action already exists in the action list as "flap-wings-once." The "flap-wings-once" action is copied and its parameters are modified for the "chuckle" behavior.

Referring now to the steps described in connection with FIG. 3, with respect to step 140, a list of decision features for the talking dragon may include: "decide-to-laugh," "decide-to-tell-story," "decide-to-fly."

In step 144, "decide-to-fly" is selected. In step 146, the data needed to support the "decide-to-fly" decision feature is determined. For instance, there are several conditions that the dragon needs to recognize to make this decision sensibly. Among them are: (1) that it is currently on the ground, (2) that there are ground-bound enemies approaching, (3) that someone is sitting on the dragon's back who wants to fly, and/or (4) that someone has told the dragon to go away. The first condition is really a precondition, and may be determined by sensing whether either foot is touching the ground. This data is not produced by existing processes (step 148), and a process is therefore created (step 150). This process produces a boolean output "true" if either foot is touching the ground, and "false" otherwise.

The second condition, ground-bound enemies approaching, requires recognition of an enemy. If enemies always wear a particular type of armor, then a process may be created that produces a boolean output "true" if a person in such armor is within 100 meters of the dragon and is walking in its direction, and produces "False" otherwise. This perception process may in turn be split into three processes (steps 152, 154), one that produces a "true" output if someone is within 100 meters, one that produces a "true" if that someone is wearing one kind of armor, and a third that produces "true" if that person is walking towards the dragon. None of these need be decomposed further (step 152), and they are therefore encapsulated in three perception features (step 156).

In step 158, a mechanism is created that summarizes all the outputs of the three perception features and makes the decision "decide-to-fly" if all three features output "true." "Decide-to-fly" may then be decomposed (step 160) further into the sequence "stretch-legs," "flap-wings-forcefully," and "tuck-legs-in" to make the takeoff look more realistic. If the available data is not sufficient to render this decision, more data may need to be identified (e.g., that the body and legs have been lifted off the ground) to support these decisions (step 162).

In step 166, at the end of the perception and decision feature process, a decision feature that contains the decision mechanism is created. The remaining tasks for designing the talking dragon include assigning priorities to all the developed perception and decision features, and creating buffers for the interchange of data between features.

The present design method may find particular application in designing an interactive system that implements an anytime algorithm. In a preferred embodiment, for example, a flying dragon may be designed using the described method to allow interruption at any time during its flight, at which time it will be able to take a sensible action, even if it hasn't reached its destination. The same would hold at multiple scales of granularity: Referring to FIG. 3 and FIG. 4, in the iterative process of decomposing features to a given level of granularity is iteratively achieved in steps 152, 160 and 180 through. The final level of granularity resulting from this process determines the granularity of the resulting anytime algorithm implementation. For example, if we encapsulate the act of storytelling as action features, the decomposition of a story could consist of "first-paragraph", "second-paragraph", "third-paragraph", etc., of which "first-paragraph" is decomposed into "first-sentence", "second-sentence", etc., and the first sentence of the first paragraph is decomposed into segments, e.g., "first-segment", "second-segment", etc. Assuming the necessary perception and decision features have been implemented, then, if the dragon has started telling a story, speaking the first segment of the first sentence of the first paragraph, an interruption can happen —by processes inside the dragon's mind or from the outside world —during any of those segments, implementing an anytime algorithm at a fine level of granularity for the story. In this case, the dragon's perception, decision, planning, and motor control effectively implement anytime algorithms.

The present design method may also find particular application in designing an interactive system that implements a distributed, asynchronous architecture. In a preferred embodiment, for example, a talking dragon's decision features related to flying may each be running on a separate computer, communicating with blackboards via a network. For example, the perception features may be running on one (or more) computers, sending their output to another computer which contains a blackboard, and the decision features read that blackboard via the network, but are themselves running on several computers, producing output that in turn is sent to yet another computer, or a separate processor sitting on the same machine. The opportunity for asynchronous, distributed processing is limited only by the size of the smallest features.

Although preferred embodiments of the invention have been described in the foregoing description, it will be understood that the present invention is not limited to the specific embodiments described above. For instance, the above described talking head and/or talking dragon may be changed to an on-line virtual sales person configured to sell various merchandise over the Internet by answering questions and carrying out conversations in a manner similar to a real sales person. Moreover, input to the system need not be through a virtual world, as described, but can be via a keyboard, mouse, windows-based graphical user interfaces, or other means.

What is claimed is:

1. A method of designing an interactive system, the method comprising: providing one or more sensors, each sensor adapted to capture one or more real-time events; providing one or more perception features, each perception feature adapted to receive information concerning one or more captured events from one or more sensors and to generate one or more perceptions; providing one or more decision features, each decision feature adapted to receive one or more perceptions from one or more perception features and to generate one or more decisions; providing one or more output mechanisms, each output mechanism receiving one or more decisions from one or more decision features, and executing one or more actions; assigning a priority level to each perception feature and each decision feature on the basis of a plurality of factors comprising duration of an action, complexity of an action, and pre-planning requirements of an action; and utilizing said priority levels to load-balance the running of perception features and decision features under time constraints and normal system operation, and to select among conflicting actions requested by two or more decision features.

2. The method of claim 1, wherein one or more of said sensors is a visual sensor.

3. The method of claim 1, wherein one or more of said sensors is a spatial sensor.

4. The method of claim 1, wherein one or more of said sensors is an auditory sensor.

5. The method of claim 1, wherein one or more of said sensors is a tactile sensor.

6. The method of claim 1, wherein one or more of said sensors is a balance sensor.

7. The method of claim 1, wherein one or more of said actions comprises generating speech.

8. The method of claim 1, wherein one or more of said actions comprises generating text.

9. The method of claim 1, wherein one or more of said actions comprises generating phonemes.

10. The method of claim 1, wherein one or more of said actions comprises generating an intonation.

11. The method of claim 1, wherein one or more of said actions comprises generating an animated movement.

12. The method of claim 11, wherein the movement includes facial expression.

13. The method of claim 11, wherein the movement includes body movement.

14. The method of claim 11, wherein the movement includes hand gesture.

15. The method of claim 11, wherein the movement includes arm gesture.

16. The method of claim 11, wherein the movement includes visemes.

17. The method of claim 1, wherein one or more of said actions comprises generating physical movement.

18. The method of claim 17, wherein the movement includes facial expression.

19. The method of claim 17, wherein the movement includes body movement.

20. The method of claim 17, wherein the movement includes hand gesture.

21. The method of claim 17, wherein the movement includes arm gesture.

22. The method of claim 17, wherein the movement includes visemes.

23. The method of claim 1, further comprising: selecting one of said decision features; and assigning a high priority level to the selected decision feature on the basis of one or more criteria, including: a. when output from the selected decision feature results in an action requiring less than approximately 500 milliseconds to perform; b. when output from the selected decision feature results in a simple action that requires few motors to perform; c. when the input to the said decision feature are output produced by a perception feature or features with a high priority; d. when the inputs to the decision feature come from a relatively few perception features; e. when the decision feature requires relatively simple processing; f. when the amount of preplanning required for the decision is low or none.

24. The method of claim 1, further comprising: selecting one of said decision features; and assigning a medium priority level to the selected decision feature on the basis of one or more criteria, including: a. when the selected decision feature results in an action requiring approximately 500–2000 milliseconds to perform; b. when the selected decision feature receives output from a relatively large number of features; c. when the selected decision feature is clearly related to hand-holding of the interaction between the system and a system user; d. when the input to the said selected decision feature is from a perception feature with a high or medium priority level; e. when the amount of preplanning required for the decision is intermediate; f. when the action resulting from the decision feature's decision output is complex, or requires a high number of motors to be performed.

25. The method of claim 1, further comprising: selecting one of said decision features; and assigning a low priority level to the selected decision feature on the basis of one or more criteria, including: a. when the duration of an action resulting from said selected decision feature is approximately longer than 2000 milliseconds; b. when said selected decision feature requires complex processing; c. when said selected decision feature requires large amounts of preplanning; d. when said selected decision feature is related to a knowledge-based topic other than the interaction itself; e. when the input to said selected decision feature is from a feature with a medium or low priority level.

26. The method of claim 1, further comprising: selecting one of said perception features; and assigning a high priority level to the selected perception feature on the basis of one or more criteria, including: a. when input of said selected perception feature is a single data entry, or a collection of very few data entries; b. when input of said selected perception feature comes from a single sensor; c. when the processing time of said selected perception feature supports one or more actions having a perception-to-action loop time that is shorter than 500 milliseconds; d. if one or more decision features supported by said selected perception feature supports one or more outputs that result in an action requiring less than approximately 500 milliseconds to perform; e. when data needed already exists as raw data; f. when data gathering takes roughly 300 milliseconds or less; g. when input of said selected perception feature is produced by one or more perception features each of which have been assigned a high priority.

27. The method of claim 1, further comprising: selecting one of said perception features; and assigning a medium priority level to the selected perception feature on the basis of one or more criteria, including: a. when data gathering of said selected perception feature spans approximately between 300 and 1500 milliseconds; b. when input to said selected perception feature comprises a relatively large number of data points from more than one sensor; c. when a decision feature supported by the output of said selected perception feature is directly related to an interaction between said interactive system and its users; d. when data processing of said selected perception feature requires information from various parts of said interactive system, including the context of an interaction; e. when said selected perception feature supports perception-to-action loop time between 500 and 1500 milliseconds; f. when said selected perception feature takes between 300 and 1500 milliseconds to produce output; g. when said selected perception feature's input is the output of other perception features that have been assigned a medium or high priority level; h. when said selected perception feature's output supports a decision feature whose resulting action takes between 500 and 1500 milliseconds to perform.

28. The method of claim 1, further comprising: selecting one of said perception features; and assigning a low priority level to the selected perception feature based on one or more criteria, including: a. when data gathering of said selected perception feature requires longer than approximately 1500 milliseconds; b. when data processing of said selected perception feature requires complex data or knowledge structures for producing output; c. when said selected perception feature produces complex, knowledge-based output;

d. when said selected perception feature's output supports processes for high-level decision making such as complex natural language processing or planning ahead; e. when data processing of said selected perception feature takes more than 1500 milliseconds to perform; f. when data processing of said selected perception feature requires information from multiple parts of said interactive system, including the context of an interaction; g. when said selected perception feature's input is the output of other perception features that have been assigned a low or medium priority level; h. when said selected perception feature's output supports a decision feature whose resulting action takes longer than 1500 milliseconds to perform; i. when said perception feature is difficult or impossible to decompose into small perceptual features; j. when said perception feature typically cannot support a perception-to-action loop of shorter than 1500 millisecond duration.

29. The method of claim 1, wherein the method is used to design an interactive system that implements one or more anytime algorithms.

30. The method of claim 1, wherein the method is used to design an interactive system that is implemented in a distributed, asynchronous architecture.

* * * * *